W. J. COWAN.
RESERVE GASOLENE TANK.
APPLICATION FILED MAR. 15, 1920.
1,366,247. Patented Jan. 18, 1921.
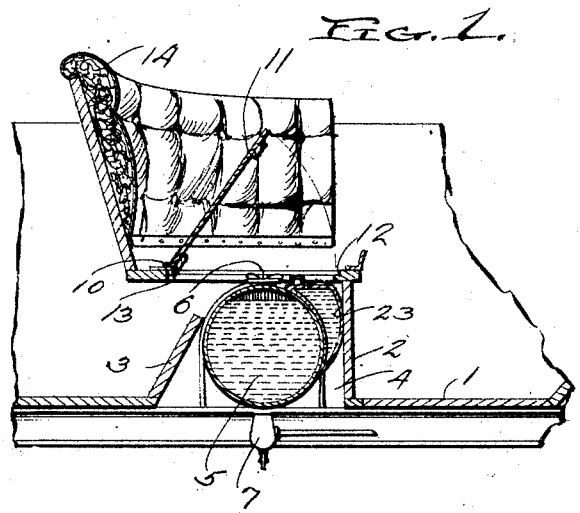
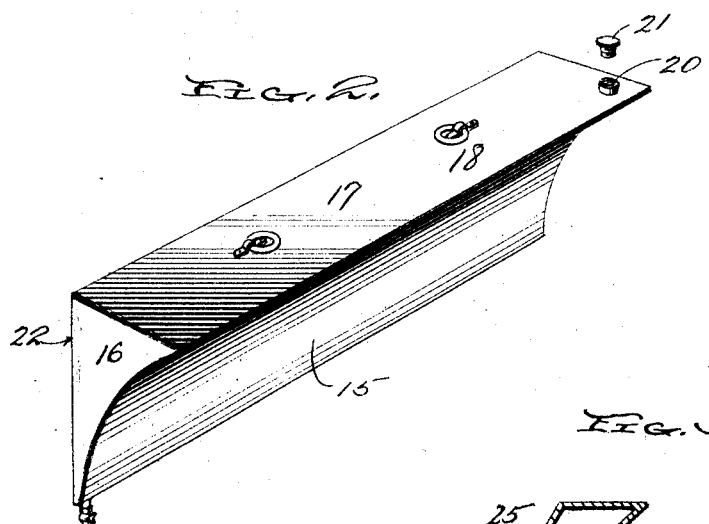
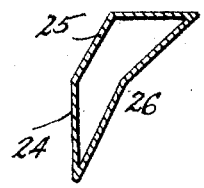
Inventor
William J. Cowan
By
Attorneys

UNITED STATES PATENT OFFICE.

WILLIAM JESSIE COWAN, OF RUSSELLVILLE, ARKANSAS.

RESERVE GASOLENE-TANK.

1,366,247.  Specification of Letters Patent.  Patented Jan. 18, 1921.

Application filed March 15, 1920. Serial No. 365,793.

*To all whom it may concern:*

Be it known that I, WILLIAM J. COWAN, a citizen of the United States, residing at Russellville, in the county of Pope, State of Arkansas, have invented certain new and useful Improvements in Reserve Gasolene-Tanks; and I do hereby declare the following to be a full, clear, and exact description of the invention, such as will enable others skilled in the art to which it appertains to make and use the same.

This invention relates to liquid and gaseous fuel tanks, and more especially to those adapted to contain a reserve supply. It is well known to the motorists that, no matter how great his care, occasions will arise when the gasolene runs out and leaves him stranded in his car remote from a filling station or other place where he can renew his supply of liquid fuel; and he is compelled to travel or send some distance for more "gas" or else have it brought to him, and in either event to suffer considerable delay and expense. There has grown up among the more careful motorists the custom of carrying a reserve supply as for instance a pint or a quart of extra gasolene in a bottle or can put away somewhere about the car. Of course this is liable to leak, its closure may become loose or lost and the gasolene run out without the knowledge of the driver as he is seldom called on to use the reserve, and the storage of gasolene anywhere except in the tank in which it belongs is fraught with more or less danger and inconvenience.

It is the purpose of the present invention to produce as an automobile accessory a tank for the reserve supply of gasolene, which tank is so shaped that it can be put into the waste space within the chamber under the front seat where the regular tank is ordinarily located. Therein it fits snugly so as not to rattle, it is protected by the cover and seat cushion the same as the regular tank, it is accessible for use or for filling in the same way, and it may be reached when the regular supply runs out. While no invariable dimensions and shape may be ascribed to the structure, its general features are set forth in the following specification and shown in the drawings wherein:

Figure 1 is a sectional view through the main tank of an automobile located under the front seat, and also through this reserve tank in place.

Fig. 2 is a perspective view of one form of the reserve tank.

Fig. 3 is a diagram showing a slightly different form.

Rising from the flooring 1 are the front and rear walls 2 and 3 of a chamber 4 beneath the front seat of the ordinary automobile, within which chamber is disposed the regular gasolene tank 5. The latter is shown herein as of cylindrical cross section, having at its top an opening closed by a screw plug 6 and which is removed for filling purposes, and having at its bottom a pipe 7 leading to the engine. Flanges 12 and 13 project from the walls 2 and 3 inward a slight distance over the chamber 4, and to the rear flange at 10 is hinged a cover 11 usually having a hole near its free edge for the passage of the finger, said free edge resting on the front flange when the cover is closed. The front seat cushion is then put back onto the cover 11 forward of the seat-back 14. This is the description of the usual arrangement and disposition of a cylindrical tank 5 within a rectangular chamber 4, and obviously there is a certain amount of space wasted within and at the corners of the chamber. It is proposed to make use of this wasted space, as can be done by the ordinary car owner, unless the tank fits very closely within the chamber. But with a cylindrical tank in a substantially rectangular chamber there is space for the reserve tank which forms the subject matter of the present invention.

Referring now to Fig. 2, the reserve tank therein shown could be substantially triangular in cross section, its inner wall 15 preferably curving to conform as nearly as possible with the curvature of the main tank, its ends 16 being flat to fit within the ends of the chamber 4, and its length only a trifle less than that of the chamber itself. Its top 17 should also be flat, and will be provided with one or two handles 18 such as rings which may be turned down flat onto the top to permit the cover to be closed. It may have a filling opening, preferably near one corner as at 20, closed by a plug 21 or any other suitable closure. Its back 22 as shown in Fig. 2 is flat and stands at right angles to its top 17. But this is not always possible. In Fig. 1 the front flange 12 projects over the mouth of the chamber 4 so that a tank with a strictly flat back could not be inserted, and there the back 23 is curved a little. In Fig. 3 the back is flat for part of its height 24, and beveled off at its upper end at 25. This view is also made use of to show that the front 26 might be formed in two planes rather than struck on a curve as shown at 15, but in any event the front is preferably dished so that the structure can fit over the main tank and extend down beside the same as far as possible. Also while it may be necessary to bevel off the upper corner as shown at 25 in order to get the tank into place under the flange 12, it does not follow that it is necessary to curve the entire rear wall as shown at 23. No hard-and-fast rule as to the details or construction of this tank or its dimensions can be given, and I therefore reserve the widest latitude in this respect consistent with the terms of the claims below.

In use the reserve tank is put into place and pushed down tightly so that it prevents rattle by and between any of the parts, and yet its top 17 should stand sufficiently low to permit the cover 11 to be closed. The motorist now drives his car as usual while the engine is fed with gas from the main tank 5, and the supply kept in the reserve tank remains there and is not used, being simply carried about whenever the car moves and wherever it goes. When the time comes that the owner runs out of gasolene at some place where he cannot replenish it, he has but to pull the reserve tank out of its position as shown in Fig. 1, remove the plug 21 and the plug 6, and pour his reserve supply into the main tank, after which he can get home or at least can get to the nearest supply station; and the cost of the structure would well offset the expense and inconvenience to which he might otherwise be subjected because he became stranded on the road. In replenishing the supply in his main tank, he will of course replenish that in the reserve tank against the repetition of the emergency.

What is claimed as new is:

1. The combination with a motor vehicle having a substantially rectangular chamber, and a substantially cylindrical main gasolene tank mounted within said chamber; of a reserve gasolene tank substantially triangular in cross section and removably inserted between the wall of the chamber and main tank, the reserve tank having a flat top adapted when in place to stand substantially flush with the top of the main tank, said flat top having a filling opening and a closure therefor, and handles on said top.

2. The combination with a motor vehicle having spaced upright walls with inwardly projecting flanges at their upper edges, and a cover hinged upon one flange and adapted to close onto the other to define a rectangular chamber, and a substantially cylindrical main gasolene tank mounted within said chamber; of a reserve gasolene tank substantially triangular in cross section with its inner wall dished to conform to the wall of the main tank and its rear wall cut away at its upper edge to pass under one flange.

3. The combination with a motor vehicle having spaced upright walls with inwardly projecting flanges at their upper edges, and a cover hinged upon one flange and adapted to close onto the other to define a rectangular chamber, and a substantially cylindrical main gasolene tank mounted within said chamber; of a reserve gasolene tank of slightly less length than said chamber and substantially triangular in cross section, its inner wall being dished to approximate the shape of the main tank, its rear wall cut away to pass under said rear flange, and its top wall being provided with a filling opening and closure, and with handles whereby it may be removed for use.

In testimony whereof, I affix my signature in the presence of two witnesses.

WILLIAM JESSIE COWAN.

Witnesses:
W. J. WRIGHT,
L. GARDNER.